United States Patent

Winkels et al.

Patent Number: 5,309,700
Date of Patent: May 10, 1994

[54] HARVESTING MACHINE

[75] Inventors: Guenter Winkels; Juergen Schlachter, both of Zweibrücken, Fed. Rep. of Germany

[73] Assignee: Deere & Company, Moline, Ill.

[21] Appl. No.: 935,497

[22] Filed: Aug. 25, 1992

[30] Foreign Application Priority Data

Aug. 28, 1991 [DE] Fed. Rep. of Germany ....... 4128475

[51] Int. Cl.⁵ ..................... A01D 45/00; G01L 1/02
[52] U.S. Cl. ..................... 56/10.2; 56/DIG. 15
[58] Field of Search ....... 56/10.2 D, 10.2 E, DIG. 15

[56] References Cited

U.S. PATENT DOCUMENTS

| | | |
|---|---|---|
| 3,623,301 | 11/1971 | Höfer ............... 56/DIG. 15 X |
| 3,698,164 | 10/1972 | Boone et al. .......... 56/DIG. 15 X |
| 3,886,718 | 6/1975 | Talbot . |
| 4,180,966 | 1/1980 | Zen ................. 56/DIG. 15 X |
| 4,332,126 | 6/1982 | Van Auwelaer et al. ... 56/DIG. 15 X |
| 4,414,792 | 11/1983 | Bettencourt et al. .... 56/DIG. 15 X |
| 4,631,907 | 12/1986 | Zirps ................ 56/DIG. 15 X |
| 4,640,368 | 2/1989 | Kittle et al. . |
| 4,873,817 | 10/1989 | Harms ............... 56/DIG. 15 X |
| 4,982,613 | 1/1991 | Becker . |

FOREIGN PATENT DOCUMENTS

| | | |
|---|---|---|
| 622446 | 9/1961 | Belgium . |
| 2232235 | 1/1974 | Fed. Rep. of Germany . |
| 2830794 | 2/1979 | Fed. Rep. of Germany . |
| 3240791 | 5/1984 | Fed. Rep. of Germany . |
| 3343895 | 6/1984 | Fed. Rep. of Germany . |
| 3434131 | 3/1986 | Fed. Rep. of Germany . |
| 3515126 | 10/1986 | Fed. Rep. of Germany . |
| 2324219 | 9/1976 | France . |

OTHER PUBLICATIONS

Robert Bosch GmbH–Elektronischer Kraftsensor Publicatoin KG/VKD-2 Bey 005/5 DE (May 1982) (Including p. 120 of "Weiters Information" 1984.

*Primary Examiner*—Mark Rosenbaum
*Assistant Examiner*—Frances Han

[57] ABSTRACT

A combine has a forward vertically adjustable header or attachment for removing crop material from the field. The header is pivotally mounted on the combine frame and is vertically adjusted by varying the length of a hydraulic cylinder that has one end attached to the header and its other end attached to the combine frame by a pivot pin that includes a force sensor that generates an electric signal proportional to the weight of the header supported by the cylinder. The electric signal provides an input to a control system that controls the flow of hydraulic fluid to and from the hydraulic cylinder.

2 Claims, 2 Drawing Sheets

HARVESTING MACHINE

ASSIGNMENT

The entire right, title and interest in and to this application and all subject matter disclosed and/or claimed therein, including any and all divisions, continuations, reissues, etc., thereof are, effective as of the date of execution of this application, assigned, transferred, sold and set over by the applicant(s) named herein to Deere & Company, a Delaware corporation having offices at Moline, Ill. 61265, U.S.A., together with all rights to file, and to claim priorities in connection with, corresponding patent applications in any and all foreign countries in the name of Deere & Company or otherwise.

The invention concerns a harvesting machine, preferably a combine, with an attachment supported on the machine's frame, and whose height can be controlled by at least one strut whose length can be controlled and which has one end connected to the attachment and the other end connected to the frame by a pin in a bearing.

BACKGROUND OF THE INVENTION

Harvesting machines, in particular combines and forage harvesters, are provided with crop recovery attachments whose height can be controlled by means of hydraulic cylinders. Under certain operating conditions it is necessary to lower these crop recovery attachments all the way to the ground and to guide them along the ground with only a low contact force. In order to evade irregularities on the ground, mechanical or pneumatic spring systems are provided in the supply lines to the hydraulic cylinders or between the hydraulic cylinders and the crop recovery attachments that permit the crop recovery attachments to be raised easily and thereby avoid an excessively high ground contact force. In some cases a pressure indicator is used to display the instantaneous contact force to the operator so that manual control of the height can be undertaken. All these possibilities of height control of the attachment on harvesting machines have the disadvantage that they are not sensitive enough and therefore do not respond to small changes in the contact force, or do so only too late.

In addition it is known practice in agricultural tractors (Bosch-Hydraulic, Supplementary Production-Information, K6/VKD 2-BEY005/5 DE (5.82)) to control a ground breaking implement that is coupled to a three-point implement hitch by means of an electronic force sensor that is integrated into a pin. Further developments of force sensors of this type as applied to agricultural tractors are described in a large number of publications. In this connection reference is made, for example, to EP-A1-0 238 875, DE-A1-35 15 126, DE-A1-34 34 131 and U.S. Pat. No. 4,982,613.

The problem underlying the invention is seen as that of proposing a harvesting machine with an attachment whose height is automatically controlled very simply in relation to the contour of the ground with minimal changes in contact force or significant time delay.

According to the invention an electronic output signal can be generated from the resistance of the attachment during its movement across the ground, which is in direct relationship to its contact force, and the signal is processed in a control or regulating device that controls a hydraulic valve which initiates a change in length of the strut and thereby changes the height of the attachment. The use of an electronic control assures an extremely fast response to irregularities of the ground and largely eliminates the influence of friction forces in the strut.

Although the pin with the force sensor could be installed in various ways, for example, in axial alignment with the strut, it is preferred to arrange it in such a way that the forces applied to it act radially so that it can simultaneously act as a pivot bearing.

With very wide attachments it is possible that they are raised by a ground irregularity only at one side or only in the center. In order to assure that any resulting change in contact force does have an effect, several struts and several pins with force sensors are provided. These force sensors are preferably connected to a small computer in such a way that an increase in the applied force at only one pin is sufficient to raise the attachment, while a lowering of the attachment requires reduction of the applied force at all the force sensors. However, not every strut is required to act on a force sensor.

If the various struts are configured differently so that they can absorb as well as apply different levels of force, precise operation of the control is assured if compatibility of the signals generated can be attained, which can be accomplished by the use of differing force sensors or by an amplification or attenuation of the signal in a compensating circuit.

The lowest possible reaction time, that results in an almost constant contact force, is attained when the sensitivity of the force sensor in connection with the control arrangement is as low as 15 millivolts.

An override switch is provided in order to permit the operator to change the height of the attachment manually at the end of a field or under certain conditions.

In order to reduce as far as possible the bearing friction of the struts and the attachment in the bearing arrangement at the frame, needle bearings or journal bearings are provided.

The use of an electronic force sensor of the type HITCHTRONIC TYP KS 5 of Robert Bosch G.m.b.H., in particular, results in a simple installation of an electronic height control of the attachment of a harvesting machine.

The drawing shows an embodiment of the invention described in greater detail in the following.

DESCRIPTION OF THE PREFERRED EMBODIMENT

Figure 1:
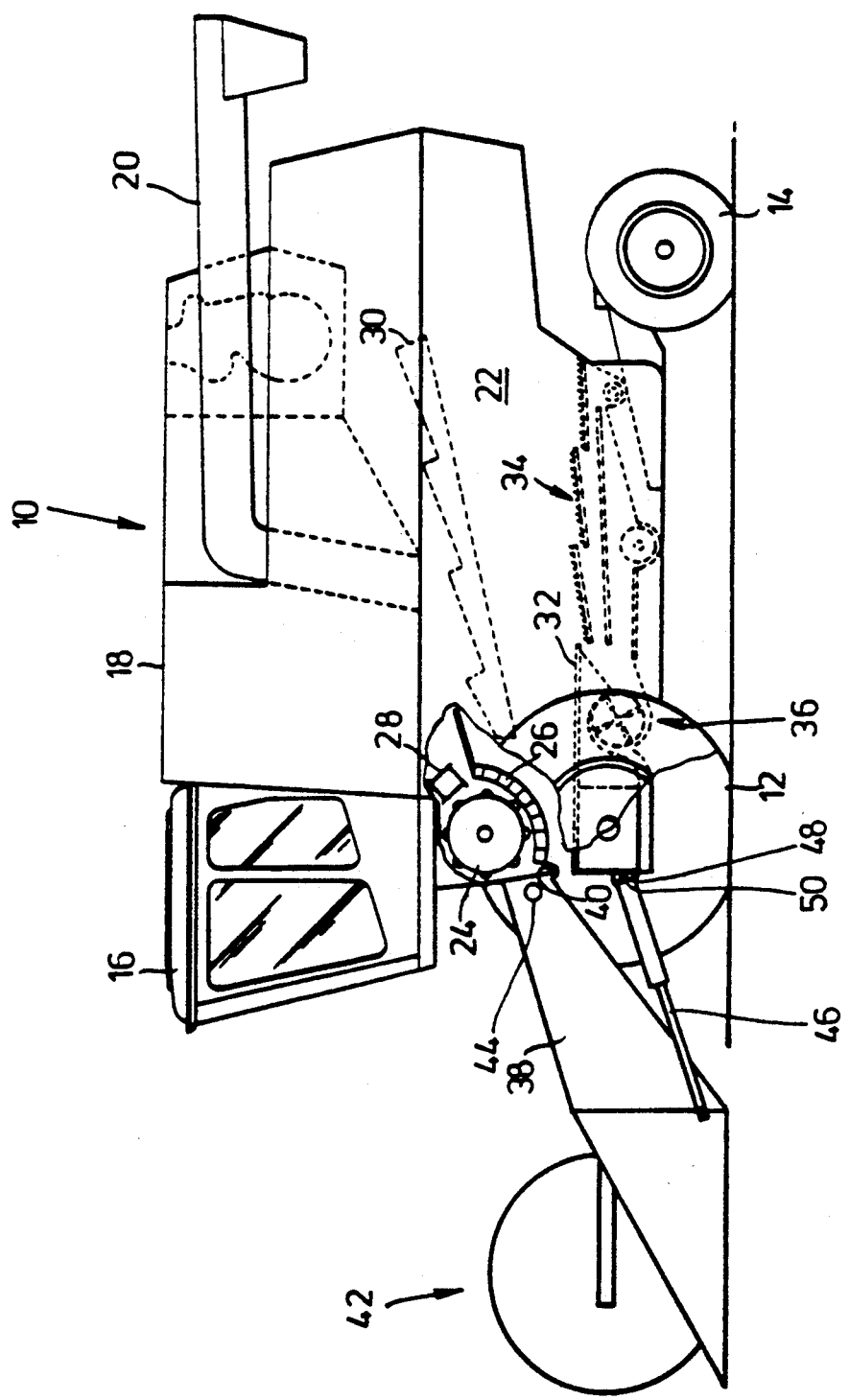
FIG. 1 shows a side view of a harvesting machine according to the invention.

A harvesting machine 10 shown in FIG. 1, configured as a combine, is supported on driven front wheels 12 and steerable rear wheels 14 and is provided with an operator's cab 16 from which it can be controlled by an operator. In place of a combine, a forage harvester, a cotton picker or a baler could apply equally. To the rear of the operator's cab 16 a grain tank 18 is located that can deliver crop deposited therein through a discharge conveyor 20 to the outside. The grain tank 18 is supported on a main frame or body 22 in which crop supplied is separated into large and small components in its path between a threshing cylinder 24 and a concave 26 and below a beater drum 28. The harvested crop is separated further on the following straw walkers 30 as well as on a separating pan 32 and sieves 34, where finally the part of the crop threshed out is conveyed into the grain tank 18. The large components are deposited on the ground by the straw walkers 30 and light components are blown by a blower 36 from the sieves 34 to the ground. Crop standing or lying on the ground is transported by an inclined conveyor or feeder housing 38 over a stone catcher trough 40 to the threshing cylinder 24 after being removed from the field by an attachment 42.

The attachment 42 is mounted on a bearing arrangement 44 so that it is able to move vertically with respect to the frame 22 and is supported by several struts 46, only one of which is shown in the drawing. Each strut is attached to the frame 22 through a bearing 48. A pin 50 extends through the bearing 48, perpendicular to the direction of travel of the harvesting machine 10, and pivotally retains the strut 46.

The attachment 42 may be a cutterbar header, a pickup mechanism, a corn picker or any other crop recovery implement for special crops and can be positioned at various distances from the ground, in order to harvest the crop at various heights above the ground or in order to be brought into a transport position at the end of the field. The attachment can be lowered to the ground so as to glide along the ground with a low contact force, so that it follows the contours of the ground.

The bearing arrangement 44 may be configured as a journal bearing, but to reduce friction it may be a needle bearing, not shown. The bearing arrangement 44 supports the inclined conveyor 38 and the attachment 42 rigidly connected to it, at both sides of the conveyor so that it is free to pivot vertically, and the bearing 44 is located above the bearing 48.

In this embodiment the strut 46 is configured as a single-acting hydraulic cylinder with a cylinder containing a movable piston, and whose effective length can be varied by means of a control system 52 to be described later. At its forward end, shown on the left in the drawing, the strut 46 is pivotally connected to the attachment 42, while its rear end is pivotally attached to the bearing 48 by the pin 50. The strut 46 may, however, be configured as an electrical spindle drive or as a pneumatic motor.

The bearing 48 is conventionally configured as a fork with two legs, that pivotally engage between them the end of the strut 46 at the right in the drawing, by means of a pin 50. In this specific embodiment the bearing 48 is attached to the front axle of the harvesting machine 10.

The pin 50 extends through three bores in the legs of the bearing 48 and in the right end of the strut 46 that are concentric to each other, and is provided in its interior with a force sensor, not shown. The pin So is preferably configured as an electronic force sensor of the type HITCHTRONIC TYP KS 5 of Robert Bosch G.m.b.H. However, any number of other commercially available pins 50 with force sensors May be used, that may detect the applied force by other means and convert that to an output signal.

It should be noted that the drawing shows in each case only one bearing arrangement 44, one strut 46, one bearing 48 and one pin 50. In the actual arrangement of the invention at least double number of these components are provided, specifically at each side of the inclined conveyor 38 as seen in the longitudinal direction of the harvesting machine 10, where, however, not every pin 50 is necessarily provided with a force sensor. Beyond that three struts 46, three bearings 48 and three pins 50 could be provided if this should be necessitated by the weight of the attachment 42, where the struts 46 and the pins 50, in such a case, could be configured differently.

Figure 2:
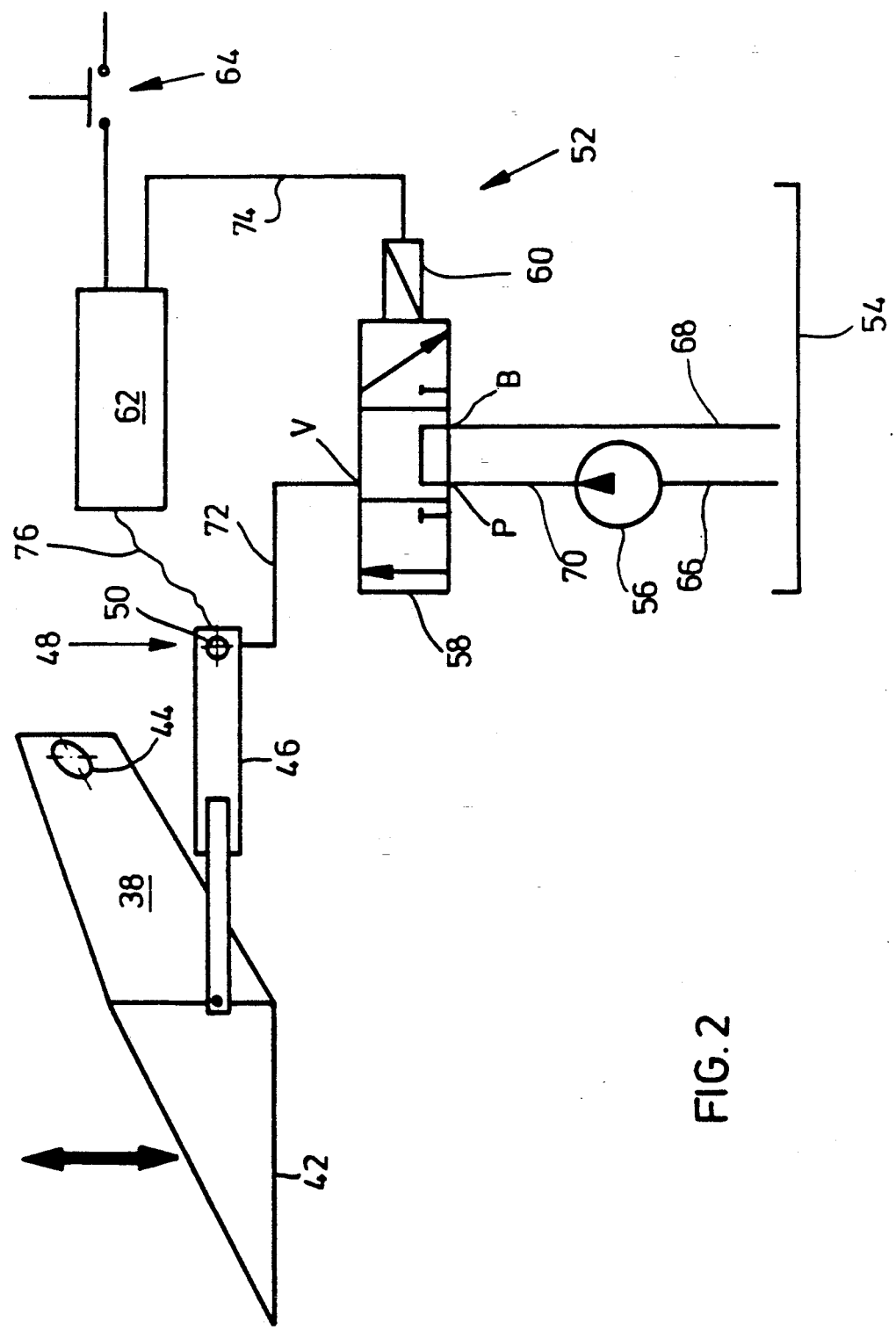
FIG. 2 shows a control circuit for the harvesting machine.

In the following reference is made to FIG. 2, which shows the control system 52 for the adjustment of the strut(s) 46.

The control system 52 contains a reservoir 54, a pump 56, a valve 58, a solenoid 60, a control device 62, a switch 64 and several electric and hydraulic lines that connect these components with each other.

In this embodiment the reservoir 54 stores hydraulic fluid, that is delivered to the pump 56 through a line 66, and receives such fluid from the strut 46 through the valve 58 and a line 68.

The pump 56 is a constant-output pump, driven by a motor, not shown, and transmits pressurized fluid through a line 70 to a pump connection P on the valve 58. Between these a pressure relief valve, not shown, may be provided.

The valve 58 is a three-way valve, with three positions and three connections, that is controlled by means of the solenoid 60. On the same side as the pump connection P, there is a reservoir connection B to which the line 68 is connected. Opposite the pump connection P and the reservoir connection B there is an output connection V where a line 72 from the strut 46 connects. In a first, central and neutral position the pump 56 pumps into the reservoir 54 and the line 72 is blocked. In a second, inflow position, shown to the left in the drawing the pump 56 pumps into the strut 46 and the reservoir connection B is blocked, and in a third, return position, pressurized fluid flows out of the strut 46 into the reservoir 54, while the pump connection P is blocked.

The electromagnet 60 is controlled by the control arrangement 62 and is able to move the valve 58 into the aforementioned positions. For this purpose it is connected by an electrical line 74 to the control arrangement 62 so as to receive a control signal. Instead of one electromagnet, several could be used possibly with an additional return spring.

The control device 62 is preferably configured as an electronic unit and, if possible, programmable. It receives an input signal through an electrical line 76 from the force sensor of the pin 50. It is therefore able to detect the strength of the signal, which is in direct or inverse proportion to the force applied to the pin 50, and generate an output or control signal that actuates the solenoid 60 and thereby moves the valve 58 in one direction or the other. Depending on the conditions to be considered, the control device 62 may contain a compensating circuit, a delay circuit, an amplifier circuit, a threshold value detection circuit or the like, in order to assure accurate processing of the signal detected by the force sensor.

The switch 64 is provided in order to override the processing of the input signal in the control device 62 and to control the solenoid valve 60 manually, as may be required by the aforementioned conditions. In addition the control device 62 may be equipped with an on-off switch.

After all that it can be seen that, depending on the magnitude of the force detected by the force sensor of the pin 50, an output or control signal is generated in the control device 62 that leads to the actuation of the solenoid 60 and therewith a movement of the valve 58.

We claim:

1. In a harvesting machine having a mobile main frame and a forward harvester attachment for removing crop from a field as the machine advances and pivotally connected to the main frame by a transverse pivot means for vertical adjustment of the attachment relative to the ground, the combination therewith of an improved control system for controlling the vertical adjustment of the attachment and comprising:

at least one hydraulic cylinder having one end connected to the attachment;

a transverse pivot pin means connecting the other end of the cylinder to the main frame so that extension and retraction of the cylinder respectively rises and lowers the attachment, the pivot pin means also comprising an electronic force sensor means operative to generate an electric signal in proportion to the radial force exerted on the pin means by the hydraulic cylinder resulting from the weight of the attachment supported by the cylinder;

a source of hydraulic pressure;

a solenoid actuated control valve means connected to the hydraulic pressure source and operative to control the extension of the hydraulic cylinder; and an electronic control means operatively connected to the solenoid of the control valve means and the electronic force sensor means to actuate the control valve means in response to the electronic signal generated by the force sensor means.

2. The invention described in claim 1 and including a manually operated switch means connected to the electronic control means for selectively overriding the electronic control means to allow manual control of the solenoid actuated valve.

* * * * *